United States Patent [19]
Fröberg et al.

[11] Patent Number: 4,958,182
[45] Date of Patent: Sep. 18, 1990

[54] ARRANGEMENT FOR DETERMINING CAMERA SETTING

[75] Inventors: Stig O. Fröberg; Lars O. Bengtson, both of Göteborg, Sweden

[73] Assignee: Victor Hasselblad Aktiebolag, Goteborg, Sweden

[21] Appl. No.: 244,264

[22] Filed: Sep. 14, 1988

[30] Foreign Application Priority Data

Sep. 15, 1987 [SE] Sweden ................................ 8703554

[51] Int. Cl.⁵ .............................................. G03B 17/18
[52] U.S. Cl. ...................................... 354/412; 354/475
[58] Field of Search ............... 354/412, 465, 471, 474, 354/475, 289.1, 289.12; 356/226, 227

[56] References Cited

U.S. PATENT DOCUMENTS

| | | | |
|---|---|---|---|
| 4,449,822 | 5/1984 | Yuasa et al. | 354/289.12 |
| 4,676,624 | 6/1987 | Kiuchi et al. | 354/412 X |
| 4,811,043 | 3/1989 | Ishimura et al. | 354/412 |

Primary Examiner—W. B. Perkey
Attorney, Agent, or Firm—Poms, Smith, Lande & Rose

[57] ABSTRACT

A camera includes a central processing unit which determines the exposure of the film in accordance with the zone method. A light measuring device, a diaphragm data device, a maneuverable film sensitivity switch, and a development type switch generate the data signals necessary for determining the exposure. A zone selection device and a reference point selector are also provided. The camera user selects a reference portion of the photographic subject, which is seen in a viewfinder, by means of the reference point selector and, by means of the zone selection device, chooses which zone the reference portion is to be represented by on the film. The central processing unit calculates the necessary shutter speed in accordance with the choice of the user and shows the result on a display. The zone in which an arbitrary comparison portion of the photographic subject would be represented is determined and shown on the display. The central processing unit inputs necessary data concerning light intensity, diaphragm setting, etc., by addressing via a data bus input/output units to which the diaphragm data device and the light-measuring device are connected.

13 Claims, 6 Drawing Sheets

ARRANGEMENT FOR DETERMINING CAMERA SETTING

FIELD OF THE INVENTION

The present invention relates to an arrangement for determining the setting of a camera which has a camera housing, a lens having a variable diaphragm, and a viewfinder. The invention relates particularly to an arrangement which enables and facilitates the use by a photographer of the method known within the art of photography as the "zone method".

DESCRIPTION OF THE RELATED ART

Good photometry is an essential part of good photography. Consequently, nearly every modern camera includes some device for measuring the light strength of a photographic subject or of a part of it. Information concerning the light strength is presented to the photographer by means of movable needles, numerical or other displays, or other similar devices, so that the desired diaphragm setting, exposure time, and other parameters which are important to film exposure, may be set. Alternatively, a light strength value may be processed completely within the camera for automatic setting. Semi-automatic setting is also utilized, whereby the photographer himself sets, e.g., a desired shutter speed, while the electronic circuitry of the camera chooses the setting of the remaining functions.

Light strength is usually measured by allowing all or part of the light from the photographic subject to be directed towards a light-sensitive element such as a photodiode, which generates an electrical signal corresponding to the light intensity. Two methods for measuring light are dominant and are often referred to as "averaging" or "integrating" photometry, and "spot photometry".

In averaging photometry, the setting of the camera is determined as a function of the light intensity of the entire photographic subject. This is done by directing all of the light which passes through the lens of the camera, possibly after reflection by some mirror mounted in the camera housing, towards the light-sensitive element. The significant disadvantage of this method is that portions of the photographic subject which are of no or of minor importance to the photographer can worsen the final appearance of the photograph. The presence of very bright objects such as the sun can cause other portions of greater importance to the photographer to be underexposed. Conversely, the presence of a large dark portion, e.g. dark shadows, can cause other more important portions to become overexposed. This in turn leads to important portions of the photograph exhibiting the wrong degree of contrast. In the worst case important portions may lose all texture. It is therefore obvious that the light strength of the portions of the photographic subject which are of the greatest importance to the photographer should be given greater weight when determining the exposure than the light strength of less important portions.

Spot photometry takes into account the possibility that certain portions of the photographic subject may be more important than others. Instead of allowing all incident light to reach and influence the light-sensitive element, only the light which corresponds to the most important portion of the photographic subject is allowed to pass. In single-lens reflex (SLR) cameras this is usually done by making a small area of the mirror partially or completely translucent. Through this area may pass the light which corresponds to the desired portion, whereas all other light is reflected away, e.g. toward the viewfinder of the camera. Usually it is the central portion of the photographic subject, as seen by the photographer in the viewfinder of the camera, which is the portion whose light strength is to be measured. In this way the photographer may easily aim the camera at the portion which is to be used for determining exposure setting. The light which passes through the mirror is thereby deflected towards the light-sensitive element and its measured strength is used in the usual manner to determine exposure values. In this way the effect of the light strength of undesired portions of the photographic subject is lessened so that the photographer is better able to control the degree of contrast in the most important portion of the photograph.

Many modern cameras include such an arrangement for spot measurement, but special, separate, portable light-measuring units are also commercially available to help the photographer gain the advantages of spot measurement.

One disadvantage of the spot measuring method makes itself known when the photographer wants the light strength of more than one single object or portion to be taken into consideration when determining the exposure. One known method for making this possible can be considered to be an extension of the spot measuring method: the photographer aims the camera at one of the various objects and pushes some button to cause the electronic circuitry of the camera to measure the light strength of the corresponding subject portion. The value thus obtained is stored in a memory element. This procedure is repeated for each of the different objects. The exposure values are thereafter determined as a function of the arithmetic average of the measured light strength values of the different portions. Such a device is described in the American patent U.S. Pat. No. 4,529,289 Tsunefugi et al.

When using the aforesaid spot measuring methods the photographer is provided some degree of control over the camera's choice of exposure setting so that the most important portion of the photographic subject, after film development, receives the desired degree of contrast. However, the photographer is not provided with any information concerning the relative brightness of different portions of a photograph; short of using external meters and tables it is not possible for the photographer to estimate how different portions of the picture will look after the film is developed. Is therefore very difficult for the photographer to gain a clear idea of how the contrast and brightness of the different portions, which he sees in the viewfinder of the camera when composing the photograph, will be represented on the developed film.

One method known especially amongst professional and advanced photographers, and which is based on the spot measuring method, is the so-called "zone system", which was developed foremost by the well-known American photographer Ansel Adams. The zone system is described in detail in the book "The Negative" by Ansel Adams. By utilizing the relationship between the brightness of a portion of a photographic subject and the degree of blackening with which the portion is represented on a black and white film negative; by utilizing the relationship between the degree of blackening of the film negative and the degree of obtainable contrast and texture; and by taking into account the possibility of changing the degree of contrast by means of changing the developing process itself, the zone system gives the photographer a much greater opportunity to discriminate and choose than is the case with averaging or spot measuring devices.

The state of the art is such that no camera manufactured according to the prior art makes it possible for the photographer to avoid using separate light-measuring units, tables, etc. Such separate, portable units suffer from several obvious disadvantages. The most obvious disadvantage is of course that the photographer must have with him an additional apparatus. Furthermore, the photographer is not able to concentrate on his subject, but rather must also occupy himself with handling and reading the separate units. Such a portable light-measuring unit is mentioned in the article "The Zone System" in the magazine "SLR Photography", June 1987.

SUMMARY OF THE INVENTION

The object of the present invention is to provide a camera arrangement which enables a photographer to compose photographs in accordance with the zone system, and which determines the exposure setting of the camera in accordance with this composition.

In order to achieve this object, according to the invention, the camera is provided with a reference point selector, a diaphragm data device, and a light-measuring device. The diaphragm data device generates electrical diaphragm setting signals corresponding to the setting of the diaphragm. The light-measuring device includes a light-sensitive element for measuring the light intensity from a chosen measurement portion of a photographic subject, the measuring portion being represented in a measurement field of the viewfinder, and for generating electrical light strength signals corresponding to said light intensity. The camera is futher provided with a display device and a central processing unit. The central processing unit is provided for inputing the diaphragm setting signals, film sensitivity data signals corresponding to the sensitivity of the film to be exposed in the camera, development data signals corresponding to a development of the film as determined by the camera user, and the light strength signals. The central processing unit is furthermore provided for calculating and, by transferring corresponding electrical display signals, causing to be shown on the display device:

- a calculated shutter speed which, upon film exposure, represents a reference portion of the photographic subject which is chosen by means of the reference point selector onto the film with a density corresponding to a reference zone, which is chosen by the camera user by means of a zone selection device;
- a first zone value corresponding to the reference zone as long as said reference portion is represented in the measurement field; and
- a second zone value corresponding to a comparison zone when a comparison portion of the photographic subject, which is different from the reference portion, is represented in the measurement field.

BRIEF DESCRIPTION OF THE DRAWINGS

The invention will now be described with reference to the drawings, in which.

THEORETICAL FOUNDATION OF THE INVENTION

In order to fully understand the present invention some familiarity with the basic theory underlying the zone system is necessary. This theory is described in detail in a number of technical photographic texts, e.g. "Das Zonensystem" by Peter Fischer-Piel, ikoo Buchverlag, 1986, but will now be summarized in order to make it easier to understand the invention.

When a film negative is illuminated, some light will be reflected, some will be absorbed, and some will be transmitted through the negative. The transmission (T) of a region of the film is defined as the ratio between the strength of the light which passes through the film and the strength of the light which is incident upon the film. In black and white film the transmission in each region of the film depends upon the amount of silver present in the region after development. The density ($\rho$) is defined in the following manner:

$$\rho = \log_{10} \frac{1}{T} = -\log_{10} T$$

Theoretically, the transmission T will lie in the range $0 \leq T \leq 1$. However, even completely unexposed film will always absorb and reflect some light; after development, a negative or positive film material will never be completely transparent. The transmission (T) will therefore in reality always be less than 1, which means that every film will exhibit a minimum density $\rho$ min.

It is well known to regulate the light which passes through the camera lens by means of a diaphragm. Calibration of the diaphragm is generally such that a change of one full diaphragm step corresponds to a doubling or halving of the illumination of the film.

It is also known that, for normal development, the density of each portion of a given film negative is a function of the illumination of that portion. Information defining "normal development", and thus also the relationship between illumination and density, is provided by the film manufacturer for each type of film.

A black and white photograph is created on light-sensitive paper usually by having light from a light source pass through the film negative and illuminate the paper during a carefully determined length of time. Each portion of the photograph will then exhibit an average brightness, which, depending upon the characteristics of the paper, will correspond to the brightness at some point on a so-called "gray scale", which ranges continuously from completely black, corresponding to a reflectance equal to zero (0%), to completely white, corresponding to a reflectance equal to 1 (100%). This continuous gray scale may for all practical purposes be approximated using a finite number of gray tones. The discrete scale forming the basis of the zone system is illustrated in FIG. 1.

Figure 1:
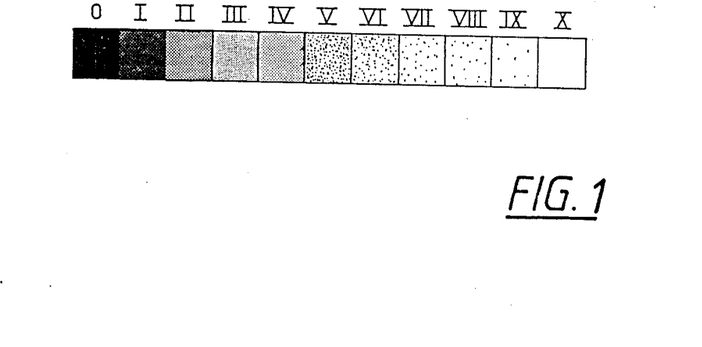
FIG. 1 illustrates a discrete gray scale.

The gray scale illustrated in FIG. 1 has 11 gray tone fields, which have been designated by the Roman numerals 0-X. Each field corresponds to a "zone". Zone 0 corresponds to the maximum degree of blackening of the photographic paper, which in turn corresponds to the portions of the negative having maximum transparency, and zone X corresponds to the maximum degree of whiteness of the photographic paper, which in turn corresponds to the portions of the negative having maximum density (minimum transparency).

Zone V usually corresponds to the grayness of a standard gray card, which exhibits a light reflectivity of 18%. The relationship between two adjacent zones is such that the brightness of the brighter zone corresponds, with normal film development, to a luminance of the corresponding portion of the photographic subject which is twice as great as that of the darker zone, which corresponds to the luminance of the darker portion of the subject. The luminance in zone VII is thus twice as great as the luminance in zone VI, which in turn has a luminance which is two times greater than the luminance in zone V.

Figure 2:
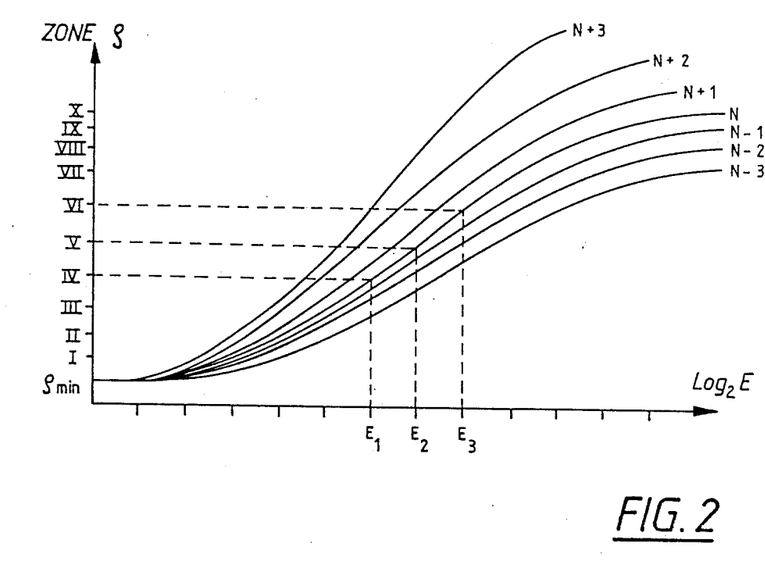
FIG. 2 illustrates a family of sensitometric curves.

Both the film density and the zones are functions of film illumination. FIG. 2 illustrates this functional dependency in the form of sensitometric, characteristic curves for different degrees of development. These curves are well known in the art and are also called "HD-curves", after their originators Ferdinand Hurters and Vero Driffields (1890). The 2-logarithm of the illumination is shown as the ordinate, and the film density $\rho$ and the corresponding zones are shown as abscissas. The use of the 2-logarithm of the illumination along the X-axis means that an increase of one scale unit, e.g. from $E_2$ to $E_3$, corresponds to a doubling of the illumination, which in turn corresponds to an increase of one diaphragm step, and a decrease of one scale unit, e.g. from $E_2$ to $E_1$, corresponds to a halving of the illumination, which in turn corresponds to a decrease of one diaphragm step.

The curve N corresponds to the relationship for normal development. As has been mentioned above, the N-curve for each film type is determined on the basis of data provided by the film manufacturer, whereby the intrinsic density of the film base, the film sensitivity, and other characteristics are taken into account. The curve designated N+1 represents the relationship for the concept generally known within the art of photography as "N+1 development". Since the different development types N−3, N−2, N−1, N, N+1, N+2 and N+3 are well established and understood among those skilled in the art of photography, they will not be described in more detail. Some observations are, however, useful in order to understand the advantages of the present invention.

For N-development there exists a linear relationship between the 2-logarithm of the illumination of the film and the zone correspondence. The relationship for other development types may as a rule be approximated with good accuracy using linear functions. It is to be noted that the scale for zone correspondence in FIG. 2 is not linear; the curves for the different developments have instead been drawn using a linear $\rho$-scale.

It should firstly be observed that all characteristic curves become mainly linear, parallel to the X-axis, and essentially coincide for very low illumination values. This mainly linear portion of the curve is referred to as the "toe" of the curve. The reason for this is that, for extremely low illumination, the density of the film will approach $\rho_{min}$, that is to say, the intrinsic density of the film base, independent of the way in which the film is later developed.

For increasing illumination every characteristic curve approaches an asymptote which is parallel to the X-axis and which corresponds to a maximum achievable film density $\rho_{max}$. The portion of a characteristic curve at which it begins to exhibit a decreasing slope for increasing illumination is referred to as the "shoulder" of the curve.

It should further be observed that the characteristic curves for most of the common, commercially available film types exhibit between the toe and the shoulder an intermediate, essentially linear section. It is in this section that the characteristic curve has its maximum slope meaning that, for this section of the curve, a change in the illumination, i.e. in the exposure, provides the maximum degree of change of film density $\rho$. This means in turn that the film in this region will exhibit the greatest sensitivity to a change in illumination. It is in this region that the film provides maximum texture and contrast for the given photographic subject.

Finally, as is seen in FIG. 2, the slope of the characteristic curve for, e.g., N+1-development, for a given illumination value, is greater than the slope of the curves for N, N−1, N−2 and N−3 developments. This means that the corresponding density interval is also greater over a given exposure interval, e.g., between $E_1$ and $E_3$. It is as if more zones "fit" within the same exposure interval. This is called "film expansion" and is a well known method for bringing about a change in the density of the film by changing the development. The converse relationship is of course also true for N−1-development as compared to N, N+1, N+2, N+3, etc., developments. In this case the phenomenon is called "film compression".

It is extremely important that the photographer choose such an exposure and development that the brightness of the subject falls within the correct zone. Only representations of the subject which lie in the zones II–XII will exhibit discernible contrast and texture; greatest contrast, that is to say, ability to distinguish details in a photographic subject, is achieved in the zones IV–VI.

In the following description of the preferred embodiment the statement that a particular point lies in a particular zone is to be understood as meaning that the light incident on the film from a small region having the point as its center point, has such luminance that, upon exposure, it causes a corresponding region of the film on which it is represented to have a density which corresponds to the said zone.

DESCRIPTION OF THE PREFERRED EMBODIMENT

Figure 3:
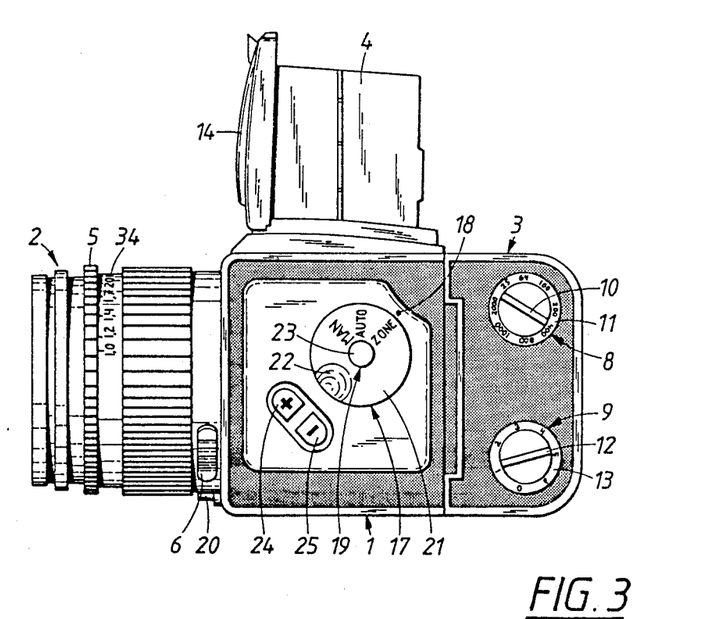
FIG. 3 shows a side view of a camera.

Referring now to the drawings, FIG. 3 shows a side view of a camera according to the preferred embodiment. The camera comprises a housing 1 on which a lens 2, a film magazine 3, and a viewfinder 4 are mounted. In this exemplifying embodiment the lens 2, the film magazine 3, and the viewfinder 4 may be removed from the housing 1, but this is not necessary according to the present invention.

The lens 2 is provided with a diaphragm ring 5 and a stop-down button 6. The diaphragm ring is provided with a numerical scale 34. By rotating the diaphragm ring 5 the user may change the adjustment of a diaphragm (not shown), as is common in cameras which allow manual adjustment of the diaphragm. In this way the strength of the light which, upon exposure of the film, passes through the lens 2 from a photographic subject to the interior of the camera housing 1 is also changed. The stop-down button 6 is mechanically coupled to the diaphragm, and by activating the stop-down button 6 the diaphragm assumes a position corresponding to the setting of the diaphragm ring 5. Such an arrangement using a diaphragm ring, diaphragm, and stop-down button is well known and well understood in the technology of photography and will therefore not be described in greater detail.

The film magazine 3 has a film sensitivity selector 8 and a development type selector 9. The film sensitivity selector 8 comprises preferably an electrical switch SW4 (not shown in FIG. 3), a turnable dial 10 and a film sensitivity scale 11. The film sensitivity scale 11 preferably shows different ISO-numbers, as is customary for cameras which allow the use of films of different sensitivities. By turning the dial 10 to a position corresponding to a desired ISO-number on the film sensitivity scale 11, the position of the switch SW4 is also changed. It is to be noted that it is not necessary to select the ISO-number which represents the actual sensitivity of a film in the film magazine 3, although this is the most common case.

As with the film sensitivity selector 8, the development type selector 9 consists of an electrical switch SW5 (not shown in FIG. 3), a turnable dial 12 and an annular scale 13. The use of the development type selector 9 is similar to the use of the film sensitivity selector 8: the user turns the dial 12 so that it points to a number on the annular scale 13 corresponding to a desired value, whereupon the switch SW5 assumes a corresponding position. The annular scale 13 is graduated in integers, and in FIG. 3 is shown an example of such graduation, from 0–6. It should however be emphasized that this choice of graduation has only been made by way of example and that other graduations, e.g. letters, −3 to +3, etc., could just as well be used. The function and purpose of the development type selector 9 will be described below.

Providing the removable film magazine 3, the film sensitivity selector 8 and the development type selector 9 is advantageous since it offers the photographer more choices and greater control when composing photographs. This is, however, not necessary according to the present invention. For example, some cameras use only film of one specific sensitivity. Using the present invention with such cameras would require only simple engineering expedients.

Figure 4:
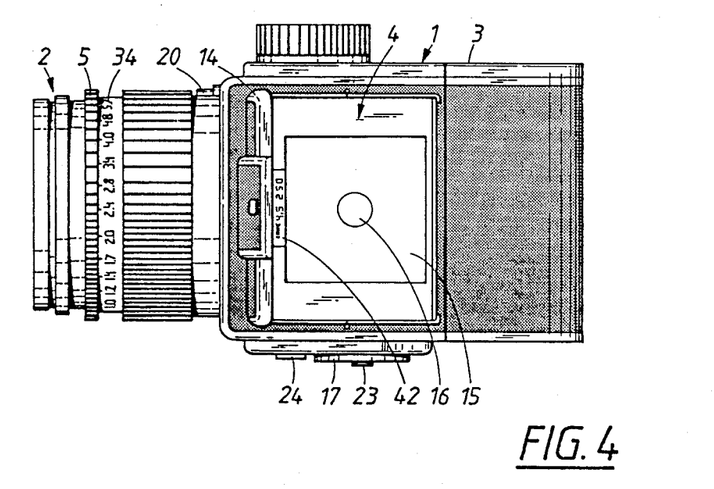
FIG. 4 shows a view of the camera from above.

FIG. 3 shows the viewfinder 3 with a raiseable and lowerable hood 14. As is best seen in FIG. 4 the viewfinder 3 includes a focusing screen 15 and a display 42. The focusing screen 15 is made of glass or of some other wholly or partially translucent material. In a manner which is well known in the field of SLR-cameras, all or a part of the light which passes through the lens 2 and into the camera housing 1 is reflected by a mirror mechanism (not shown) for framing and focusing of the photographic subject. A mainly circular measurement field 16 is marked out in the middle of the focusing screen 15.

Figure 6:
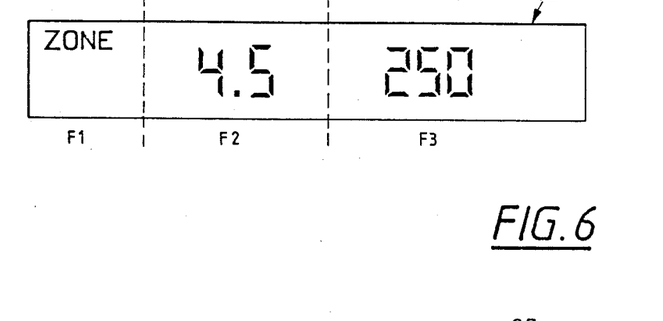
FIGS. 6 and 7 show a display in different states.

In the illustrated exemplifying embodiment the display 42 is of the liquid crystal type. The general construction and manner of operation of such an LCD-display are well known and will therefore not be described in detail below; it is sufficient to point out that a digit or letter is formed and becomes visible by exposing chosen crystal segments to a electric field and by leading electric current to the display by means of a number of electrical conductors. The display 42 according to the present invention is divided into three main fields F1, F2 and F3 as is best seen in FIG. 6. The information presented to the user in these fields will be described and explained below.

The camera housing 1 is provided with a mode selector 17, a position marking 18, a reference point selector 19, a step increment button 24, a step decrement button 25, and a release button 20, all of which are mounted on the camera housing 1 in such a way that they are easily accessible to the user when the camera is held using a preferred grip. This grip will be described below.

In this exemplifying embodiment the mode selector 17 includes a turnable disc 21, which is mechanically coupled to an electrical switch SW1 (not seen in FIG. 3) and is provided with a maneuvering surface 22. The turnable disc 21 is preferably provided with markings in the form of abbreviated words such as "MAN", "AUTO", and "ZONE", which correspond to different operational settings or "modes" of the camera. "MAN" and "AUTO" designate the manual and automatic operations methods, respectively, of the camera. Such markings and operational methods are common in modern system cameras which are able to carry out at least some functions automatically using electronics. The designation, that is to say, the position of the turnable disc 21 which is marked "ZONE", is however the one which the present invention relates to. The maneuvering surface 22 is preferably a mainly semi-circular recess in the turnable disc 21 and has preferably a scored or rough surface. By placing the tip of the thumb or of some finger on the maneuvering surface 22, the turnable disc 21 is easily rotated. By turning the turnable disc 21 so that the designation "ZONE" comes to a position closest to the position marking 18 the camera is put in a "zone mode". The position marking 18 may be a simple painted dot.

The reference point selector 19 comprises a reference point button 23 and a reference point switch SW2 (not seen in FIG. 3). The reference point button 23 and the reference point switch SW2 are mechanically connected with spring action to form a simple electrical contact. When the reference point button 23 is depressed, the reference point switch SW2 is closed; otherwise it is open.

In the illustrated, preferred embodiment the reference point button 23 is arranged in the middle of the turnable disc 21 so that the turnable disc 21 rotates about it. This is advantageous for ergonomic reasons, as will be understood from the description below, but it is of course not necessary.

The step increment button 24 and the step decrement button 25 are each connected mechanically with spring action to an electrical switch, namely a step increment switch SW3+ and a step decrement switch SW3−, respectively. When the step increment button 24 is depressed the step increment switch SW3+ is closed; otherwise it is open. The step decrement button 25 and the step decrement switch SW3− operate in an analogous manner. The placement of the buttons 24 and 25 on the camera housing 1 is chosen relative to the turnable disc 21 and to the reference point button 23 in such a way that all are easily accessible to the tip of the user's thumb with minimal hand motion when the camera is held using the preferred grip described below.

The release button 20 is mechanically connected to a release switch SW6.

The internal arrangement of the camera will now be described with reference to FIG. 5.

A central processing unit CPU, which, preferably, is a microprocessor, a read-only memory ROM, a random access memory RAM, a clock circuit CLK, a digital bus BUS, and an electric voltage supply BAT are provided in the camera housing 1.

The read-only memory ROM stores information in digital form. The information content of the read-only memory ROM is determined a the time of manufacture. The read-only memory ROM consists of a large number of memory positions, data lines, and address lines which, in some types, may be the same electrical conductors as the data lines. When an activation signal is presented to the read-only memory ROM, and an address in the form of a number of parallel digital signals is present on the data lines, the read-only memory ROM sends out on the data lines the digital signals which correspond to the content of the memory positions located at the address. This is well known in the field of digital technology and will not be described further.

The construction and method of operation of a memory component such as the random access memory RAM are also well known in the field of digital technology. Such a memory component stores digital data temporarily. The content of its memory positions may be altered arbitrarily. Reading digital data stored in the random access memory RAM is done in the same manner as has been described above in the case of the read-only memory ROM and is in any case very well known in the art.

In the preferred embodiment the central processing unit CPU, the read-only memory ROM, the random access memory RAM, and the clock circuit CLK are manufactured as a single unit by masking of a common silicon base. This is advantageous since it minimizes the space required but is of course not necessary.

The central processing unit CPU is provided with a number of separate ports (not shown) for input and output of data, as is common in microprocessors. The release switch SW6 is connected to one port on the central processing unit CPU.

The method of operation of a microprocessor and therefore of the central processing unit CPU is well known in the art. In order to understand the present invention it is sufficient to recall that a microprocessor carries out instructions, i.e. its program, sequentially, and that instructions are fetched and carried out in time with the clock circuit. According to the present invention the instructions for the central processing unit CPU, as well as tabulated values to be explained below, are stored in the read-only memory ROM. The clock circuit CLK generates the clock pulses necessary for synchronization of the internal operation of the central processing unit CPU and of data transfer to and from the central processing unit CPU and other components, as is common in applications of microprocessors. The reference frequency needed by the clock circuit CLK is provided preferably by a piezo-electric crystal 43, which is connected to the central processing unit CPU. The electric voltage supply BAT provides the central processing unit CPU, and units connected to it, with the necessary supply voltage.

Data is transferred to and from the central processing unit CPU over the data bus BUS. The data bus used in the present embodiment is the one marketed by NV Philips Gloeilampenfabriken under the name I²C bus and is described in the European patent EP 0 051 332. This data bus includes four electrical conductors, of which one is a line for serial transfer of digital data, one is a line for transferring clock pulses, one is a line for conveying supply voltage, and one is a ground line. For conveying bus signals to peripheral units which are connected to I²C bus lines, the Philips integrated circuit PCF 8574, which has an input port with 8 digital bits per connected peripheral unit, is preferably used. The shown embodiment comprises a number of input/output (I/O) units which, below, are designated IOa-h. It is to be emphasized, however, that other bus structures and so-called "interface circuits" could also be used. For understanding the present invention it is sufficient to known that data is transferred between the central processing unit CPU and a peripheral unit over the data bus BUS and via the I/O-unit to which the peripheral unit is connected. This transferal will be described in greater detail below. As was mentioned above, each I/O-unit IOa-h in the preferred embodiment is provided with an 8-bit input. In the preferred embodiment the bits of the input of each of the I/O-units IOa-f assume a logical high value, i.e., a logical "1", as a default value, and a logical low value, i.e., a logical "0", only when placed in contact with the electrical ground.

Figure 5:
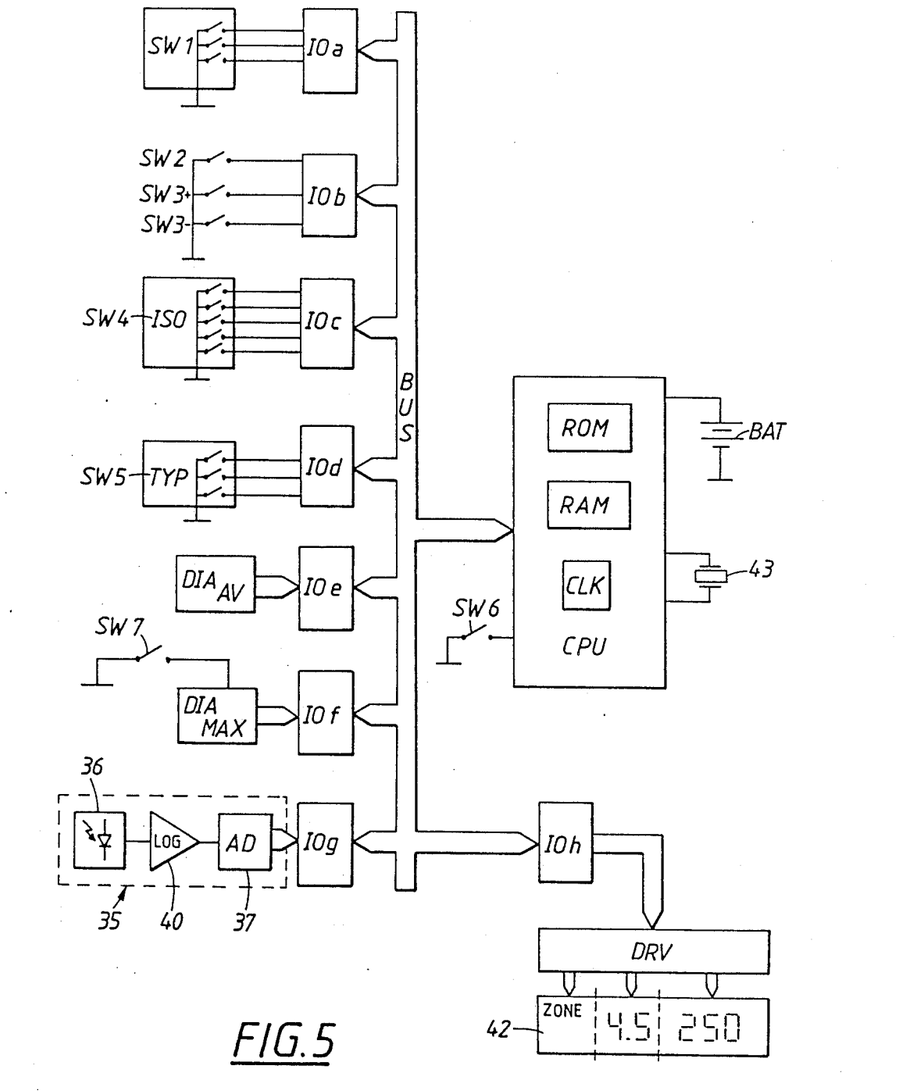
FIG. 5 is an electrical block diagram of the arrangement according to the invention.

In FIG. 5 is illustrated the way in which the electrical switch SW1 is connected to the I/O-unit IOa. In the illustrated exemplifying embodiment the switch SW1 comprises three single-pole switches, so that 8 different electrical states are possible, each position of the turnable disc 21 corresponding to one state. Information concerning a desired mode, selected by means of the mode selector 17, is thus converted to a three-bit digital word which is transferred to the input of the I/O-unit IOa. It is of course also possible to arrange the switch SW1 as a normal rotary switch with eight poles, whereby each pole is connected to one pin of the input of the I/O-unit IOa, but this would mean that five additional input pins of the I/O-unit IOa would be taken up unnecessarily.

The reference point switch SW2, the step increment switch SW3+, and the step decrement switch SW3− are connected to the I/O-unit IOb as is shown in FIG. 5.

When any of the switches SW2, SW3+ or SW3− is closed a logical "zero" arises at the corresponding input of the I/O-unit IOb, whereas, as was mentioned above, a logical "one" is present at the input when it is not closed. It should be noted that it is not necessary to connect the reference point switch SW2 to the same I/O-unit as the step increment switch SW3+ and the step decrement switch SW3−. The reference point switch SW2 could also be connected to an input of another I/O-unit or directly to a special port on the central processing unit CPU.

The connection of the switches SW4 and SW5 to the I/O-units IOc and IOd, respectively, is also illustrated in FIG. 5. The connections are analogous to the connection of the switch SW1 to the I/O-unit IOa. In the illustrated exemplifying embodiment the switch SW4 comprises five electrical contacts which, taken together, can assume 32 different states. The switch SW4 is arranged preferably as a number of concentric sliding contact rings, so that the position of the film sensitivity selector 8 is converted by the switch SW4 to a 5-bit digital word, which is transferred to the inputs of the I/O-unit IOc. The construction of the switch SW5 is similar to the construction of the switch SW4, so that information concerning the position of the development type selector 9 is transferred to the I/O-unit IOd as a 3-bit digital word.

Every lens which has a diaphragm also has a maximum possible diaphragm opening, which is constant for each particular lens and is usually stated in terms of a lowest diaphragm number. When exposing film, although it is possible, it is of course not necessary to use the maximum possible diaphragm opening, but rather the setting of the diaphragm may be varied. The actual, currently set diaphragm setting is referred to below as the "exposure diaphragm setting". In the following discussion Mx designates a value corresponding to the maximum diaphragm opening, whereas Av designates a value which gives the currently set diaphragm setting, i.e., the exposure diaphragm setting. The values which Mx and Av may assume, and the way in which they are used, will be described below.

Contact units $DIA_{av}$ and $DIA_{max}$ are provided for transferring information concerning the diaphragm setting of the camera via the I/O-units IOe and IOf. The general connection scheme is illustrated in FIG. 5. The contact unit $DIA_{av}$ is provided for generating an electrical digital signal corresponding to the positions of the diaphragm ring 5, which in turn determines the setting of the diaphragm of the camera.

Figure 8:
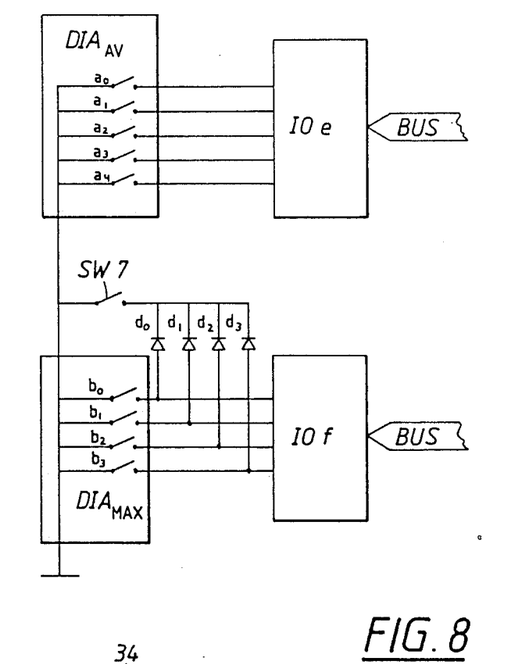
FIG. 8 shows one part of the electrical block diagram in greater detail.

The contact unit $DIA_{av}$ is illustrated schematically in FIG. 8. A 5-bit data word is formed by contacts $a_0$ and $a_4$, whereby a closed contact corresponds to a logical "0" and an open contact corresponds to a logical "1".

Figure 9:
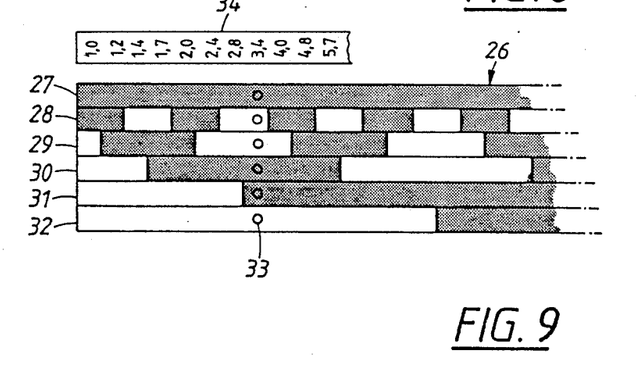
FIG. 9 illustrates an arrangement of slip ring contacts.

FIG. 9 illustrates the contact unit $DIA_{av}$ in greater detail. A contact ring 26 is securely arranged on the diaphragm ring 5. The contact ring 26 comprises a number of contact tracks 27-32. Chosen portions of each track are covered with a layer of electrically conductive material; in FIG. 9 these portions are shaded, whereas other portions, which are electrically insulating, are illustrated as being not shaded. The tracks 27-32 have the shape of narrow sections of cylindrical bands which lie adjacent to one another and are concentric with the diaphragm ring 5. Electrically conductive pins 33 are fixedly arranged on the lens 2. The number of pins 33 is equal to the number of tracks 27-32. The pins 33 are arranged in a row which is perpendicular to the direction of movement of the tracks 27-32 when the diaphragm ring is rotated. Each of the pins 33 lies against and is in electrical contact with one of the tracks 27-32.

The distribution of the electrically conductive layers on the tracks 27-32 is such that a "Gray code" is formed. The Gray code is well known in digital technology and is used when a mechanical motion is to be interpreted electrically in order to determine the position of a moving body. The Gray code is such that a change of one unit in position is represented by a digital number which differs from the representations of adjacent positions by only one digital bit. The switches SW4 and SW5 are also preferably arranged according to a Gray code.

The track 27 is at the electrical ground potential. All shaded portions of the remaining tracks 28-32 are electrically connected to the track 27 so that these also are at ground potential. If ground potential, i.e., each shaded portion of the tracks 27-32, is interpreted as a logical low value ("0"), whereas each non-shaded portion is interpreted as a logical high value ("1"), then the position of the pins 33 associated with the tracks 28-32 as they are shown in FIG. 9 can be represented by the digital number 10011.

The track 28 and its corresponding pin form a pair, which is represented in FIG. 8 as the contact $a_0$ in the contact unit $DIA_{av}$. When the pin is in contact with one of the portions of the track 28 which is provided with an electrically conductive layer, i.e., with one of the shaded portions, the contact $a_0$ is thus closed; otherwise it is open. The pairs formed by the remaining tracks 29-32 and their corresponding pins are represented by the contacts $a_1$-$a_4$. The diaphragm ring 5 is provided with a numerical scale 34. The numbers on this scale show standard designations for diaphragm steps, also known as "f-stops".

In FIG. 9 it is seen that the pins 33 are aligned with the mark 3.4 on the scale 34. If the diaphragm ring 5 is rotated, which means that the setting of the diaphragm is changed, the position of the pins 33 will change relative to the tracks 27-32 and, consequently, relative to the scale 34. The distance between the marks on the numerical scale 34 is such that it corresponds to the size of the motion of the tracks 27-32 relative to the pins 33 which is necessary in order to cause a change of one digital bit in the corresponding digital number. This distance is equal to half the length of one shaded or non-shaded portion of the track which corresponds to the least significant bit of the digital number (in the illustrated example, track 28). In this way an unambiguous representation of the diaphragm setting is obtained in the form of a digital number. As is illustrated in FIG. 8 this representation is transferred from the contact unit $DIA_{av}$ to the I/O-unit IOe.

The value of the maximum diaphragm setting Mx is set and is made accessible to the central processing unit CPU according to the same principle as has been described above for conveying information concerning the current setting of the diaphragm. The method is illustrated in FIG. 8. The contact unit $DIA_{max}$ comprises a number of contacts $b_0$-$b_3$. The state of each of these contacts $b_0$-$b_3$ does not change for a given lens since the value representing the largest diaphragm opening of the lens, i.e. Mx, is constant. The contacts $b_0$-$b_3$ may therefore be set when manufacturing the lens, and can therefore consist of simple electrical clamps or whole or severed electrical conductors, whereby a whole conductor corresponds for example to a logical "0" and a severed conductor corresponds to a logical "1". Viewed together the contacts $b_0$-$b_3$ thus form a 4-bit digital word which is transferred to the I/O-unit IOf by means of electrical conductors.

On certain occasions the photographer may desire so-called stopping down, and a stop-down button is provided on many modern system cameras. When the stop-down button 6 is depressed by the user the stop-down switch SW7 is closed, whereby all of the inputs of the I/O-unit IOf are grounded via diodes $d_0$, $d_1$, $d_2$, and $d_3$.

The camera according to the present invention comprises a light-measuring device 35, which is illustrated in FIG. 5. The light-measuring device 35 includes a light-sensitive element 36, a logarithmic amplifier 40, and an analog-to-digital (A/D) converter 37. The light-sensitive element 36 consists preferably of a light-sensitive diode. As is well known a light-sensitive diode produces an electric current whose strength is proportional to the intensity of the incident light on the diode. Other types of light-sensitive elements do not themselves generate any current, but rather their resistance varies and is proportional to the logarithm of the light intensity.

The light-sensitive element 36 is electrically connected to the logarithmic amplifier 40, the current which is generated by the light-sensitive element 36 when it is illuminated thus forming an input signal to the logarithmic amplifier 40. The output voltage from the logarithmic amplifier 40 is thus proportional to the logarithm of its input signal. By means of a simple analog calibration of the logarithmic amplifier 40, an output voltage is obtained which is proportional to the logarithm of the illumination of the light-sensitive element 36, and is limited so as to lie within a desired interval.

The electrical output voltage from the logarithmic amplifier 40 is converted to digital form by the A/D-converter, and the digital signal thus formed is conveyed to the I/O-unit IOg.

The light which is allowed to reach the light-sensitive element 36 and influence it consists of a part of the light which passes through the lens from the portion of the photographic subject which is represented in the measurement field 16 of the focusing screen 15. In order words, the portion of the subject which the user sees in the measurement field 16 is the portion whose light strength is measured by the light-measuring device 35. The light-measuring device 35 may be located in the viewfinder 4 or in the camera housing 1. In the preferred embodiment it is located in the camera housing 1. This choice makes the viewfinder 4 simpler and therefore cheaper, which is advantageous for all cameras, but is especially advantageous for cameras which accommodate interchangeable viewfinders.

It is to be observed that the strength of the light which is incident upon the light-sensitive element 36 depends on the setting of the diaphragm; if the diaphragm is stopped down at the moment of measurement, i.e., if the exposure diaphragm is set, the strength will generally be less than if the maximum diaphragm opening is set. The value Av, i.e., the value of the exposure diaphragm setting, and also Mx, i.e., the value representing the largest diaphragm opening, have been defined above. A measurement diaphragm value Mv is defined in the following manner: if, at the moment of measurement, stopping down is indicated in the manner described above, then Mv=Av; otherwise Mv=Mx.

In the present exemplifying embodiment the film sensitivity selector 8 and the development type selector 9 are each connected to a corresponding one of the I/O-units, IOc and IOd, respectively. As has been mentioned above each I/O-unit of the preferred type has one input with a size of 8 digital bits. Since the film sensitivity selector 8 and the development type selector 9 only require five and three bits, respectively, a single I/O-unit is sufficient for transferring data from both of these selectors 8, 9. In this case IOc would correspond to one part of the I/O-unit whereas IOd would correspond to the remaining part. Depending upon the mechanical construction of the camera in accordance with the present invention, other such combinations could also be possible and suitable.

Each I/O-unit IOa-h has a digital address and is addressed via the bus BUS by the central processing unit CPU in a manner which is well known within digital technology. The purpose of the I/O-units IOa-g is to transfer digital signal containing information about the state of different switches or selectors, or about the state of the light-sensitive element 36. When any of the I/O-units IOa-g is addressed it transfers the digital signals to the bus BUS and thus operates as an input port for information from peripheral units to the central processing unit CPU. It is pointed out once again that the method of addressing the I/O-units is described in the above mentioned European patent and in publicly available data sheets for the Philips I²C BUS circuit. Each of the I/O-units is two-way, i.e., it can transfer data both to and from the connected peripheral unit.

Figure 7:
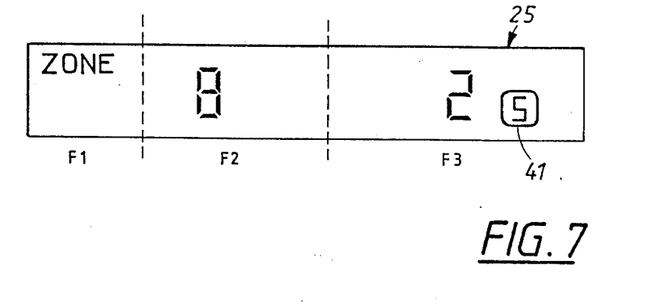

In contrast to the I/O-units IOa-g, the principle duty of the I/O-unit IOh is to transfer digital information from the central processing unit CPU, via the bus BUS, to a peripheral unit, namely, to the display 42. This is seen most clearly in FIGS. 5, 6 and 7. A digital signal sent to the I/O-unit IOh for presentation on the display 42 is first transferred to a driver DRV. The output signal from the driver DRV controls the display 42. As was mentioned above the display 42 is divided into the fields F1, F2 and F3. Depending upon the control signals from the driver DRV one of the words ZONE, AUTO, MAN etc., is shown in the field F1. The field F1 thus constitutes a mode display field. When the mode selector 17 is set, e.g., to the zone mode, the word "ZONE" is shown in the mode display field F1, and a suitable word is displayed in the mode display field F1 when the mode selector 17 is in a position corresponding to some other mode. This makes it possible for the user to adjust the mode selector 17 without needing to look at it.

The field F2 constitutes a zone display field. The zone display field F2 includes preferably at least two 7-segment digits and a decimal point. The value shown in the zone display field F2 is the result of calculations which will be described below, and it indicates which zone a chosen portion of a photographic subject lies in, whereby the chosen portion corresponds to the portion of the subject which is represented in the measurement field 16 of the focusing screen 15. In the example illustrated in FIGS. 5 and 6 the portion lies in zone 4.5.

The field F3 is a shutter speed field and indicates a set or calculated shutter speed (expressed, as is normal, in seconds). The manner in which this shutter speed is determined will be explained below. The shutter speed field F3 includes a number of 7-segment digits. The number which is shown in the shutter speed field F3 is the inverse of the shutter speed in seconds for shutter speeds which are less than one second. In the example shown in FIG. 6, the camera is thus set on a shutter speed of 1/250 second.

For shutter speeds which are greater than or equal to one second, the shutter speed is shown in seconds, whereupon a whole second indicator 41 is turned on. In the preferred embodiment the whole second indicator 41 consists of the letter "s", but other indication symbols and methods are of course conceivable. In the example shown in FIG. 7, the camera is thus set on a shutter speed of 2 seconds.

It has already been stated that each of the I/O-units IOa-h is provided with a unique digital address and is connected to the data bus BUS. By placing a valid address on the bus the central processing unit CPU can activate one of the I/O-units and begin data transferral.

The operating sequence of a microprocessor, by which it fetches a sequence of instructions, one at the time, in the form of digital words from a memory and executes them, is well known. In the camera according to the present invention the instructions for the central processing unit CPU, i.e., its program, are stored in the read-only memory ROM.

The central processing unit CPU first addresses the I/O-unit IOa and receives via the bus BUS the digital mode signal transferred by the I/O-unit IOa in the form of a digital word, which indicates the position of the switch SW1. As has been described above the position of the switch SW1 corresponds to the mode in which the photographer wishes that the camera should work. By reading in the data signal from the I/O-unit IOa the central processing unit CPU thus obtains information concerning the choice of mode. The mode signal is interpreted by the central processing unit CPU and, if the interpreted signal indicates that the zone mode is desired, the central processing unit CPU executes that portion of its program which contains instructions which cause the central processing unit CPU to carry out the steps described below. The object of the present invention is to provide a camera which makes it possible for the user to photograph according to the aforesaid zone method. It is therefore assumed in the rest of the description that the camera is to work in the zone mode.

In order to simplify the continued discussion, the statement that the central processing unit CPU fetches data from a given I/O-unit concerning a certain selector or other peripheral device is to be read as meaning that the central processing unit CPU addresses the I/O-unit in question so that data about the state of the selector or the peripheral device, which is connected to the I/O-unit, is transferred from the I/O-unit to the central processing unit CPU via the data bus BUS.

One function of the central processing unit CPU is to carry out the necessary zone and shutter speed calculations.

The variables used in the calculations will now be defined:

| | |
|---|---|
| Av | value of the exposure diaphragm setting |
| Mv | value of the measurement diaphragm setting |
| Ms | stored value of Mv |
| Lv | light level value |
| Ls | stored value of Lv |
| Fv | correction factor |
| Sv | film-sensitivity value |
| Nv | film-contrast value (development value) |
| Tv | exposure time value (calculated) |
| Zv | zone value (calculated) |
| Zn | calculated zone |

The exposure time value and the zone value are calculated by the central processing unit CPU as functions of the remaining variables. The expressions used are:

| | |
|---|---|
| (E1) | $Tv = Ls + Ms - Av + Sv - 6 \cdot Fv + (60 + 6 \cdot Fv) \cdot Nv/8$ |
| (E2) | $Zv = 8 \cdot (Lv + Mv - Ls - Ms)/(8 - Nv) + 6 \cdot Fv + 60$ |
| (E3) | $Zn = Zv / 12$ |

It is to be observed that, e.g., Sv stands for the film-sensitivity value and not the film-sensitivity. In order to ensure that the expressions given above have consistent dimensions, all quantities used in them, e.g. the film-sensitivity, are converted to dimensionless variables.

Table 1 illustrates the conversions applied by the central processing unit CPU. In the column having the heading Sv' are found commonly occurring ISO-numbers, i.e. film-sensitivity numbers. However, when evaluating the expression E1 the central processing unit CPU uses the dimensionless value Sv. The value of Sv which corresponds to a given value of Sv' is shown in the column having the heading VAL, on the same row as the given value of Sv'. ISO100 (Sv'=100) thus corresponds to the value 48.

In the columns Av' and Mx' are shown commonly occurring values of the diaphragm setting, so-called "f-stops". Corresponding values Av and Mx, i.e., the dimensionless values used by the central processing unit CPU for determining the measurement diaphragm value Mv used in the expressions E1 and E2 are found in Table 1 in the column VAL, as has been described above for Sv' and Sv.

The values Lv' are obtained by analog calibration of the logarithmic amplifier 40. The values Lv' have been determined through theoretical calculations. It should however be observed that a change in Lv', e.g. from 2 to 3, corresponds to a doubling of the light which is incident on the light-sensitive element, which in turn corresponds to a change of Mv' of one diaphragm step. The values of Lv which correspond to Lv', and which are used by the central processing unit CPU when evaluating the expressions E1 and E2, are found in Table 1 in the column VAL as has been described above.

Shutter speed is given in column Tv'. The letter "s" indicates that whole seconds are referred to ("4s" indicates 4 seconds); values not having a following "s" indicate fractions of a second ("125" indicates 1/250 seconds). A shutter speed value Tv is calculated according to the expression E1 above. The values Tv' corresponding to calculated values of Tv are given in column Tv'.

It is emphasized that the purpose of Table 1 is only to make it easier to understand the working procedure of the central processing unit CPU when evaluating the expressions E1 and E2. A table corresponding to the column VAL in Table 1 is stored in the read-only memory ROM. Storing digital representations of tables in read-only memories such as ROM is a commonly known technique in applications of microprocessors and it will therefore be described only briefly by means of the following example. As was explained above, data concerning the exposure diaphragm setting Av is not transferred from the contact unit $DIA_{av}$ to the central processing unit CPU in the form given in Table 1 as Av', but rather as a 5-bit digital word i Gray code. This digital word in Gray code is used by the central processing unit CPU to generate the digital address at which the corresponding value Av is stored in the read-only memory ROM. In a corresponding manner, the 4-bit digital signals generated by the switch SW4, corresponding to a set film sensitivity, are used by the central processing unit CPU to generate the digital address in the read-only memory ROM at which the corresponding value Sv is stored.

The conversion table represented by Table 1 has been determined by means of calculations and experiments. As was stated above there is a linear relationship between the logarithm of the film illumination and the zone correspondence. The relationship for other developments can as a rule be closely approximately by linear functions.

Table 2 illustrates a conversion table for obtaining a film contrast value Nv corresponding to a development type value set by means of the switch SW5. For example, Nv=2 if N+2-development is indicated by the switch SW5. The coded digital signal corresponding to the selected development type is transferred from the switch SW5 to the central processing unit CPU as was described above. This signal is converted directly by the central processing unit CPU into the corresponding value of Nv.

The correction factor Fv receives a value which is equal to the difference between the number of times the step increment switch SW3+ is closed and the number of times the step decrement switch SW3− is closed, counted from the time that the reference point switch SW2 was most recently closed. Forming this difference is accomplished by an accumulation in one memory position in the random access memory RAM; when the reference point switch SW2 is closed, the central processing unit CPU begins by zeroing the correction factor Fv and thereafter it accumulates Fv by incrementing Fv by one every time the increment switch SW3+ is closed and by decrementing Fv by one every time the step decrement switch SW3− is closed. The significance of this will be made clearer below. It should be observed that if all other variables in the expression E2 are held constant, an increase of Fv by one unit will cause Zn to increase by 0.5, and a decrease of Fv by one unit will cause Zn to decrease by 0.5.

When the central processing unit CPU, in the manner stated above is put in the zone mode by means of setting and sensing the position of the switch SW1, it fetches data about the set film sensitivity via the I/O-unit IOc, which means that it fetches Sv. Thereafter it fetches data about the development type via the I/O-unit IOd so that Nv is determined.

The central processing unit CPU thereafter fetches data via the I/O-unit IOg corresponding to the light intensity, so that Lv is determined and, via the I/O-units IOe and IOf, diaphragm data, i.e., the current exposure diaphragm setting and the maximum diaphragm setting. As is seen in FIG. 8, stopping down is interpreted as a special case of the maximum diaphragm setting. If the stop-down SW7 is closed, all of the inputs of the I/O-unit IOf are grounded; if SW7 is not closed, the input values to the I/O-unit IOf are determined only by the state of the contacts $b_0$–$b_3$. Av and Mx can thus be determined.

The central processing unit CPU addresses the I/O-unit IOb in order to fetch data concerning the state with reference point switch SW2, the step increment switch SW3+, and the step decrement switch Sw3−. Assume that the reference point switch SW2 is closed, i.e., that the reference point button 23 is depressed. As will be described in greater detail below this means that the photographer has chosen a point in the photographic subject as a reference point.

The central processing unit CPU continues to address the remaining I/O-units IOc-f as has just been described, but the value of Lv' which is fetched the first time the I/O-unit IOg is addressed after the reference point switch SW2 is sensed as being closed, is stored in the random access memory RAM as Ls. The value of Mv which is first fetched after the first time the I/O-unit IOg is addressed after the reference point switch SW2 is sensed as being closed, is stored in the random access memory RAM as Ms. Ms thus represents a stored value of the measurement diaphragm setting, i.e., of Mv. The diaphragm setting—the maximum diaphragm setting Mx or the current exposure setting Av—which serves as the measurement diaphragm setting, is determined by the state of the stop-down switch SW7. If the step-down switch SW7 is not closed when the central processing unit CPU addresses the I/O-unit IOf, Mv is set equal to Mx; if it is closed Mv is set equal to Av.

Ls and Ms thus represent the light level value and the current measurement diaphragm setting, respectively, for the reference point for the latest depression of the reference point button 23. It is to be observed that Zn=5 for Ls=Lv, Ms=Mv and Fv=0. Upon subsequent addressing of the I/O-unit IOb, data concerning the position of the step increment switch SW3+ and the step decrement switch SW3− is fetched, whereupon the correction factor Fv is determined continuously in the manner which was described above.

The central processing unit CPU continues to address the I/O-units IOa-g in order to update and to evaluate the expressions E1, E2 and E3 for each such addressing cycle.

The central processing unit CPU calculates the exposure time value Tv according to the expression E1.

The central processing unit CPU addresses thereafter the I/O-unit IOh and transfers digital signals which cause Tv' to be displayed in the shutter speed field F3 of the display 42. It is to be observed that these digital signals indicate which of the LCD-segments of the shutter speed field F3 are to be turned on in order for Tv' to be shown. This technique is well known among those skilled in the art. By way of example assume that the expression E1 gives a value of Tv=180. The corresponding value of Tv' is 125. "125" will therefore be displayed in the shutter speed field F3.

Digital signals are also transferred from the central processing unit CPU to the I/O-unit IOh so that the value Zn, calculated according to the expression E3 and rounded to the nearest multiple of 0.5, is shown in the zone display field F3 of the display 42, and the shutter speed is shown in the shutter speed field F3 as has been described above.

According to the present invention the display 42 is of course not restricted to the three fields F1, F2 and F3, and the fields are not limited to indicating only the information mentioned in the description of the preferred embodiment. It would for example be a simple matter of engineering to arrange a warning indicator in the zone display field F2 which is turned on when the portion of the photographic subject seen in the measurement field 16 of the focusing screen 15 lies in zones where it, for example, would lack texture, fall outside of the zones 0-X, etc.

The calculated shutter speed is also used by the central processing unit CPU to adjust driving circuitry (not shown) for the shutter of the camera. The state of the release switch SW6, which corresponds to the position of the release button 20, is also sensed during each addressing cycle. When the release switch SW6 is sensed as closed the central processing unit CPU sends a signal to the shutter driving circuitry causing release of the shutter and exposure of the film.

Other I/O-units could of course also be connected to bus BUS. The central processing unit CPU would therefore be able to address and control other peripheral units such as a film winder, a printer, etc. It is wholly possible according to the present invention for example to connect a diaphragm driver to the I/O-unit IOe, to which the contact unit $DIA_{av}$ is also connected, the function of the diaphragm driver being to change automatically the setting of the diaphragm in accordance with signals which are transferred from the central processing unit CPU via the I/O-unit IOe.

It is to be observed that the above described order in which the various I/O-units are addressed is not necessary, since the central processing unit CPU can address all of the I/O-units much faster than the human user is able to cause a change in the parameters used in the various expressions.

The preferred grip of the camera will now be described with reference to FIGS. 3 and 4. The photographer holds the camera so that the fingers of the left hand extend under the camera housing 1, so that the tip of the left thumb reaches the mode selector 17, the step increment button 24, and the step decrement button 25, and so that the left index finger reaches the release button 20. The right hand is then free to maneuver, e.g., a film winding crank (not shown in the drawings). The camera is held in front of the body of the photographer and is aimed at a photographic subject, which is seen represented on the focusing screen 15. It is emphasized that the present invention does not relate to a way of gripping the camera and that it is equally applicable for cameras which have a different preferred grip. Although experience has shown that the described camera grip is advantageous it is of course not necessary in order for the photographer to be able to enjoy the advantages of the present invention.

Figure 10:
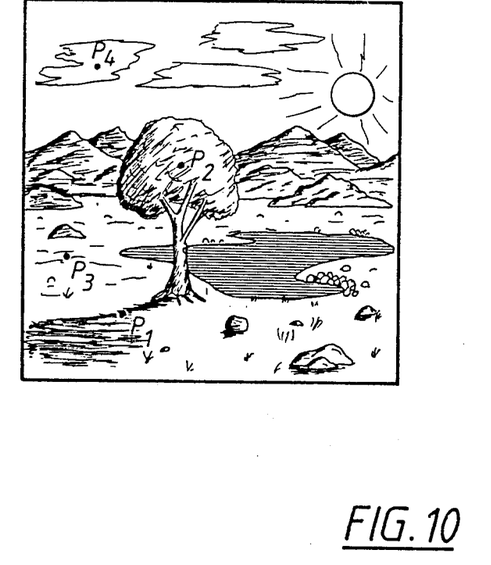
FIG. 10 illustrates an example of a possible photographic subject.

An example of the use of the camera according to the present invention will now be discussed with reference to FIG. 10 in order to clarify the purpose of the aforesaid operating procedure of the central processing unit CPU. FIG. 10 represents an example of a possible photographic subject. Assume that a lens which is mounted on the camera housing 1 has a maximum diaphragm setting of 2 (which according to Table 1 corresponds to $Mx=24$), that the setting of the diaphragm is for the moment 8 ($Av=72$), that the sensitivity of the film loaded in the camera is ISO400 ($Sv=72$), and, finally, that N-development ($Nv=0$) is indicated by the development type selector 9.

Assume that the photographer aims the camera, e.g., at the point p1. This means that the portion of the subject at p1 will be seen in the measurement field 16 of the focusing screen 15, which in turn means that the light-sensitive element 36 is influenced by the light passing through the lens coming from the subject portion at p1.

With the camera aimed at p1, the photographer presses the reference point button 23 of the reference point selector 19. Assume that the light intensity of p1 is such that $Lv'$ for it is equal to 7 ($Lv=132$). Ls is set equal to Lv, and Ms is set equal to Mv, as was described above.

According to the expression E1, $Tv=156$, which (see Table 1) corresponds to an exposure time of 1/30 s. According to the expressions E2 and E3, $Zn=5$. "5" is therefore shown in the zone display field F2 of the display 42, and "30" is shown in the shutter speed field F3. It should be observed that the reference point will always be placed in zone V ($Zn=5$) as long as the correction factor Fv is equal to 0. This means that the exposure time for the film is automatically calculated so that the reference point is placed in the zone which exhibit the maximum degree of contrast.

If the photographer wishes to know which zone some other portion of the photographic subject, e.g. p3, will lie in for the exposure values which have been determined for a chosen reference point, he aims the camera at this subject portion so that its representation is seen in the measurement field 16 of the focusing screen 15. If this subject portion has a different light intensity than that of the reference point, i.e., if the corresponding light level value Lv is not equal to that of the reference point, which has been stored as Ls, then the expressions E2 and E3 will yield its zone number, and the zone will be shown in the zone display field F2.

It is, however, in no way necessary that the exposure be determined so that the reference point will lie in zone V. Assume that the photographer wishes the point p1 to lie in zone II instead of in zone V. The point p1 is chosen as the reference point as was described above, whereupon the zone is displayed as "5" and the exposure time is shown as being 1/30 s. Recall that a decrease in the correction factor Fv of one unit leads to a decrease of the zone value by 0.5. Since the photographer wishes a decrease from zone V to zone II, i.e., a decrease of three zone steps, he therefore presses six times on the zone decrement button 25. As a result of evaluating the expressions E1, E2 and E3 above the zone will be shown as "2" and the shutter speed will be calculated as 1/250 s ($Tv=192$). "250" is therefore displayed in the shutter speed field F3.

The photographer can thereafter aim the camera at another arbitrary portion of the photographic subject, and in the zone display field F2 will be shown the zone which the arbitrary subject portion would lie in upon exposure of the film with the displayed shutter speed and with the reference point in the desired zone. Assume for example that the photographer aims the camera at the point p4 illustrated in FIG. 10. Assume further that its light intensity, as determined by the light-measuring device 35, is such that its light level value $Lv'$ is 13 ($Lv=204$), which means that p4 will be shown as falling in zone VIII, so that "8" is shown in the zone display field F3.

According to the present invention the photographer is not forced to accept an exposure which causes the point p4 to fall in zone VIII when the reference point lies in zone II. Assume that the photographer wishes the point p4 to be placed in zone IX while still holding the reference point p1 in zone II. While the camera is still aimed at p4 the photographer adjusts the development type selector 9 so that N+1 development is indicated. As the result of the expressions E2 and E3 ($Zv=106$), the point p4 will then fall in zone IX as desired. The exposure time value Tv is recalculated according to the expression E1 so that $Tv=195$. This corresponds to a somewhat shorter exposure time than the exposure time of 1/250 s calculated according to the earlier example. This change compensates for the increased film density which N+1 development causes in the reference point. The photographer may thereafter aim the camera at additional arbitrary portions of the subject and in the zone display field F2 will be shown the zone in which the respective portion would fall with the reference point in zone II and the point p4 in zone IX, using N+1 development.

A different reference point is chosen simply by aiming the camera at the corresponding portion of the photographic subject and by pressing the reference point button 23. Observe that the aforesaid procedure may be carried out in a different order. If for example the photographer knows N−2 development will be used, this value may be entered by means of the development type selector 9 before any reference point is chosen.

It is to be noted that the zone system may also be used in connection with a positive film material. A simple adjustment of the present invention, for example, a simple change in the expressions E1, E2 and E3 together with the provision of an additional simple switch marked, for example, "POS/NEG", would be sufficient.

From the description of the preferred embodiment mentioned above it should now be obvious that the present invention enables the photographer to compose photographs in accordance with the zone system. The invention thus achieves its purpose.

Many deviations from the preferred embodiment are possible and many of these have been mentioned above. It is however emphasized that these fall within the scope of the following patent claims.

TABLE 1

| VAL | Tv' | Av' | Sv' | Mx' | Lv' |
|-----|-----|-----|-----|-----|-----|
| 0   | —   | —   | —   | —   | −4  |
| 12  | —   | 1.4 | 12  | 1.4 | −3  |
| 24  | —   | 2   | 25  | 2   | −2  |
| 36  | —   | 2.8 | 50  | 2.8 | −1  |
| 48  | 16s | 4   | 100 | 4   | 0   |
| 60  | 8s  | 5.6 | 200 | 5.6 | 1   |
| 72  | 4s  | 8   | 400 | 8   | 2   |
| 84  | 2s  | 11  | 800 | 11  | 3   |
| 96  | 1s  | 16  | 1600| 16  | 4   |
| 108 | 2   | 22  | 3200| —   | 5   |
| 120 | 4   | 32  | 6400| —   | 6   |
| 132 | 8   | 45  | —   | —   | 7   |
| 144 | 15  | 64  | —   | —   | 8   |
| 156 | 30  | 90  | —   | —   | 9   |
| 168 | 60  | —   | —   | —   | 10  |
| 180 | 125 | —   | —   | —   | 11  |
| 192 | 250 | —   | —   | —   | 12  |
| 204 | 500 | —   | —   | —   | 13  |
| 216 | 1000| —   | —   | —   | 14  |
| 228 | 2000| —   | —   | —   | 15  |
| 240 | 4000| —   | —   | —   | 16  |
| 252 | 8000| —   | —   | —   | 17  |
| 253 | —   | —   | —   | —   | >17 |
| 254 | —   | —   | —   | —   | —   |
| 255 | —   | —   | —   | —   | <−4 |

TABLE 2

| Development type | Nv |
|------------------|----|
| N − 3            | −3 |
| N − 3            | −2 |
| N − 1            | −1 |
| N                | 0  |
| N + 1            | 1  |
| N + 2            | 2  |
| N + 3            | 3  |

What is claimed is:

1. A camera system including arrangements for determining camera setting comprising a camera housing, a lens provided with an adjustable diaphragm, and a viewfinder, as well as:
   central processing means;
   digital input/output means and digital bus means for conveying digital address and data signals between the central processing means and the input/output means;
   reference point selection means for registering an illumination of a reference portion of a photographic subject;
   diaphragm data means for generating first and second diaphragm data signals, and for applying said diaphragm data signals to said central processing means, said diaphragm data means comprising:
   (a) first diaphragm setting means for generating said first diaphragm data signals corresponding to a current setting of the adjustable diaphragm;
   (b) second diaphragm setting means for generating said second diaphragm data signals corresponding to a maximum possible opening of the diaphragm; and
   light-measuring means for measuring light intensity from a chosen measurement portion of a photographic subject, said measurement portion being represented in a measurement field of the viewfinder, for generating electrical light strength signals corresponding to said light intensity, and for applying said light strength signals to said central processing means;
   maneuverable development type selection means for generating development data signals corresponding to a plurality of development types, and for applying said development data signals to said central processing means;
   means, including a maneuverable film-sensitivity selector, for generating and applying film sensitivity data signals to said central processing means;
   display means;
   zone selection means for selectively generating zone selection signals and for applying said zone selection signals to said central processing means;
   said reference point selection means, said diaphragm data means, said light-measuring means, said means for applying film sensitivity data signals to said central processing means, said display means, and said maneuverable development type selection means, each being electrically connected to said input/output means;
   said central processing means including means:
   (a) for generating the digital address signals for arbitrary addressing of said input/output means;
   (b) for calculating and transferring to said display means, and for displaying:
      (i) a calculated shutter speed for representing, upon film exposure and in accordance with a chosen development type, chosen by means of said maneuverable development data type means, a reference portion of the photographic subject, chosen by means of said reference point selection means, in a reference zone, chosen by means of said zone selection means;
      (ii) a first zone value corresponding to said reference zone as long as said reference portion is represented in said measurement field, and
      (iii) a second zone value corresponding to a comparison zone when a comparison portion, different from the reference portion, of the photographic subject, is represented in said measurement field.

2. A camera system including arrangements for determining camera setting according to claim 1, said first diaphragm data means including stop-down indication means for generating a stop-down signal when the lens is stopped down.

3. A camera system including arrangements for determining camera setting according to claim 1, said zone selection means including:
   (a) step decrement means for generating a zone step decrement signal; and
   (b) step increment means for generating a zone increment signal.

4. A camera system including arrangements for determining camera setting comprising a camera housing, a lens provided with an adjustable diaphragm, and a viewfinder, as well as:
   central processing means;

reference point selection means for registering an illumination of a reference portion of a photographic subject;

diaphragm data means for generating diaphragm setting signals corresponding to a current setting of the adjustable diaphragm, and for applying said diaphragm setting signals to said central processing means;

light-measuring means for measuring light intensity from a chosen measurement portion of a photographic subject, said measurement portion being represented in a measurement field of the viewfinder, for generating electrical light strength signals corresponding to said light intensity, and for applying said light strength signals to said central processing means;

maneuverable development type selection means for generating development data signals corresponding to a plurality of development types, and for applying said development data signals to said central processing means;

means for applying film sensitivity data signals to said central processing means;

display means;

zone selection means for selectively generating zone selection signals and for applying said zone selection signals to said central processing means;

said central processing means including means for calculating and transferring to said display means, and for displaying:

a calculated shutter speed for representing, upon film exposure and in accordance with a chosen development type, chosen by means of said maneuverable development data type means, a reference portion of the photographic subject, chosen by means of said the reference point selection means, in a reference zone, chosen by means of said zone selection means;

(b) a first zone value corresponding to said reference zone as long as said reference portion is represented in said measurement field, and (c) a second zone value corresponding to a comparison zone when a comparison portion, different from the reference portion, of the photographic subject, is represented in said measurement field.

5. A camera system including arrangements for determining camera setting according to claim 4, said diaphragm data means comprising:

(a) first diaphragm setting means for generating first diaphragm data signals corresponding to a current setting of the adjustable diaphragm; and (b) second diaphragm setting means for generating second diaphragm data signals corresponding to a maximum possible opening of the diaphragm;

said diaphragm setting signals including said first and second diaphragm data signals.

6. A camera system including arrangements for determining camera setting according to claim 5, said diaphragm data means further comprising stop-down indication means for generating a stop-down signal when the lens is stopped down; and said diaphragm setting signals including said stop-down signal.

7. A camera system including arrangements for determining camera setting according to claim 4, said means for applying film sensitivity data signals to said central processing means including a maneuverable film-sensitivity selector for generating said film sensitivity data signals.

8. A camera system including arrangements for determining camera setting according to claim 4, including digital input/output means and digital bus means for conveying digital address and data signals between the central processing means and the input/output means, said central processing means being further provided for generating the digital address signals for arbitrary addressing of said input/output means.

9. A camera system including arrangements for determining camera setting according to claim 8, said input/output means comprising a plurality of digital input/output units.

10. A camera system including arrangements for determining camera setting according to claim 8, said reference point selection means, said diaphragm data means, said light-measuring means, said means for applying film sensitivity data signals to said central processing means, said display means, and said maneuverable development type selection means, each being electrically connected to said input/output means.

11. A camera system including arrangements for determining camera setting according to claim 4, said zone selection means including:

step decrement means for generating a zone step decrement signal; and step increment means for generating a zone increment signal;

and in which the central processing means is provided for determining said shutter speed and said reference such that said reference zone assumes said first zone value, chosen by the camera user by activating said step decrement or said step increment means.

12. A method for photographing with a film camera a photographic subject in accordance with the zone system including the following steps:

(a) selection of a reference portion of the subject by activating reference point selection means included in the camera after maneuvering the camera so that the image of the reference portion falls in a light-strength measurement region of the camera;

(b) setting the camera diaphragm by maneuvering diaphragm setting means;

(c) selection of a reference zone in which said reference portion is to be represented in the developed photograph by maneuvering reference zone selection means included in the camera and with reference to calculated zone data displayed by the camera;

(d) selection of a development type by maneuvering development type selection means included in the camera;

(e) releasing the camera shutter to expose the film with a calculated shutter speed; and (f) development of the film in accordance with the development selected by the development type selection means.

13. A method for photographing with a film camera a photographic subject in accordance with the zone system as claimed in claim 12, including the following additional steps:

(a) selection of a comparison portion of the subject different from the reference portion by aiming the camera at the reference portion by maneuvering the camera so that the image of the comparison portion falls in the light-strength measurement region of the camera;
(b) selection of a comparison zone value in which the comparison portion is to be represented in the developed photograph;
(c) adjustment of the development type by maneuvering said development type selection means until a calculated zone value corresponds to a selected zone value; and
(d) development of the film after exposure using the adjusted development type.

* * * * *